United States Patent
Kawaguchi

(10) Patent No.: US 7,873,950 B2
(45) Date of Patent: Jan. 18, 2011

(54) GRAPH THEORY-BASED APPROACH TO XML DATA BINDING

(75) Inventor: Kohsuke Kawaguchi, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 1336 days.

(21) Appl. No.: 11/388,588

(22) Filed: Mar. 23, 2006

(65) Prior Publication Data

US 2007/0244912 A1  Oct. 18, 2007

(51) Int. Cl.
G06F 9/45 (2006.01)
(52) U.S. Cl. .................................... 717/144
(58) Field of Classification Search .......... 717/149, 717/144
See application file for complete search history.

(56) References Cited

U.S. PATENT DOCUMENTS

| | | | |
|---|---|---|---|
| 7,086,014 B1 * | 8/2006 | Bartz et al. | 716/1 |
| 7,412,658 B2 * | 8/2008 | Gilboa | 715/762 |
| 2004/0148586 A1 * | 7/2004 | Gilboa | 717/108 |
| 2010/0050152 A1 * | 2/2010 | Gilboa | 717/106 |

* cited by examiner

Primary Examiner—John Chavis
(74) Attorney, Agent, or Firm—Osha • Liang LLP

(57) ABSTRACT

A technique in accordance with one embodiment of the invention automatically generates class interfaces for regular expressions based on graphs that correspond to the regular expressions. According to one embodiment of the invention, a graph is automatically generated based on a regular expression. Strongly connected components within the graph are automatically identified. For each strongly connected component within the graph, a separate method is generated within a class interface for the regular expression. In one embodiment of the invention, if a strongly connected component contains a cycle, then the method corresponding to that strongly connected component is generated to return a List of "T," where "T" is a type that is as specific as the contents of the strongly typed component permit.

18 Claims, 4 Drawing Sheets

GRAPH THEORY-BASED APPROACH TO XML DATA BINDING

BACKGROUND

A regular expression is a description of a pattern composed from combinations of symbols and operators. For example, the following text is a regular expression:

Name :=(Firstname, Middlename?, Lastname)

The above regular expression represents that a "Name" consists of exactly one "Firstname," followed by zero or one "Middlenames" (the "zero or one" being denoted by the question mark in the expression), followed by exactly one "Lastname."

The above regular expression also can be represented in the form of a tree. FIG. 1 is a diagram that illustrates a tree structure that represents a regular expression. The illustrated tree indicates that the regular expression is a "SEQUENCE" of three nodes: a "Firstname" node, an "OPTIONAL" node, and a "Lastname" node. The presence of the "OPTIONAL" node indicates that child nodes of that node are not mandatory within instances that conform to the regular expression. Thus, the "OPTIONAL" node corresponds functionally to the question mark that is associated with the "Middlename" in the regular expression discussed above. Because the "Middlename" node follows the "OPTIONAL" node, instances that conform to the regular expression can, but do not need to, contain any "Middlename."

When a regular expression is used to indicate the structure of an Extensible Markup Language (XML) document, the regular expression is called a "schema." An XML document conforms to a schema if the elements within that XML document follow the structure indicated in the schema. For example, the following XML data conforms to the regular expression discussed above:

```
<Name>
    <Firstname>Kohsuke</Firstname>
    <Lastname>Kawaguchi</Lastname>
</Name>
```

The XML data comprises exactly one "Firstname" element ("Kohsuke") followed by exactly one "Lastname" element ("Kawaguchi") as required by the regular expression. The XML data conforms to the structure of the regular expression despite the absence of a "Middlename" element, because the regular expression requires zero or one "Middlenames." In this case, the XML data comprises zero "Middlename" elements, which is acceptable. XML data that conforms to a schema is often called a "valid instance" with respect to that schema.

Taken together, multiple regular expressions such as the one discussed above may be seen as defining a "type system." For example, the regular expression discussed above defines the structure of a "Name" type in such a type system. Regular expressions can be used to describe data types.

It is often useful to generate programs that read or write XML data that conforms to a regular expression. For example, one might write a JAVA program that contains a class specifically designed to read instances of the "Name" type from one or more XML documents. Such a class might have an interface similar to the following:

```
Class Name {
    Firstname getFirstname( );
    Lastname getLastname( );
    Middlename getMiddlename( );
}
```

Using constraints available within the JAVA type system, the above class represents the constraints of the type system defined by the regular expression. To read a "Firstname," "Lastname," or "Middlename" element from an XML document, a computer program may invoke the appropriate "getFirstname," "getLastname," or "getMiddlename" method of the "Name" class. Within the program code, each method may be implemented specifically to read and return the appropriate type of element. For example, the interface of the "getFirstname" method specifically indicates that the "getFirstname" method is to return data of a "Firstname" type. Thus, the type system defined in the XML document is preserved in the return types of the methods.

Such classes are very useful. Because these classes are so useful, it is beneficial to attempt to automate, to the extent possible, the generation of the interface of these classes and the interfaces of these classes' methods. A computer program that receives a type system, such as one or more regular expressions (i.e., a schema), and attempts to automatically generate class and methods that correspond to the type system, is called a "schema compiler." The process of generating class and methods that correspond to such a type system is called "data binding."

Sometimes the automatic generation of class and methods is relatively straightforward. However, complications can arise when the regular expressions to which the interfaces correspond are more complex.

For example, one might define a type "X" in the following manner:

X :=(A, B?, C?)|(B, C?)|C

In plain English, this complex regular expression reads as, "X consists of an arbitrary combination of A, B, and C, but there must be at least one of them," as that is typically the intention of the schema author when he writes a regular expression like this. The following sequences are all of those which conform to the constraints of this complex regular expression: "A," "AB," "AC," "ABC," "B," "BC," and "C."

At first glance, it might seem that this complex regular expression could be expressed in simpler terms. However, the constraints defined by this complex regular expression are not the same as the constraints defined by either of the following other simpler regular expressions:

X :=(A|B|C)
X :=(A?, B?, C?)

The sequences "AB," "AC," "BC," and "ABC," which conform to the complex regular expression discussed previously, don't conform to the first of these other regular expressions. Additionally, the empty sequence, which doesn't conform to the complex regular expression discussed previously, conforms to the second of these other regular expressions.

Unfortunately, existing schema compilers do not handle complex regular expressions in an optimal manner. For example, if an existing schema compiler received, as input, the complex regular expression discussed above, the existing schema converter might generate the following class and methods:

```
Class X {
    List<Object> getContent( );
}
```

The above interfaces are not very specific. The method "getContent" would merely read and return a list of elements of non-specific "Object" types. In JAVA, "Object" is the most general type. When data is stored in an "Object" type, the more specific information that might have been available concerning that data's original type is not preserved.

Yet, one of the prime reasons that data is stored in an XML document in the first place is so that the specific types (e.g., "Firstname," "Middlename," "Lastname") of the data stored therein are defined. Failing to preserve the specific types of data specified within an XML document tends to defeat the very reasons why the data was stored in XML format in the first place. Thus, the non-specific "getContent" method is not very useful.

Existing schema compilers are limited in effectiveness by their inability to generate, automatically, type-specific methods based on complex regular expressions.

SUMMARY

A technique in accordance with one embodiment of the invention automatically generates class interfaces for regular expressions based on graphs that correspond to the regular expressions. According to one embodiment of the invention, a graph is automatically generated based on a regular expression. Strongly connected components within the graph are automatically identified. For each strongly connected component within the graph, a separate method is generated within a class interface for the regular expression. If a strongly connected component contains a cycle, then the method corresponding to that strongly connected component is generated to return a List of "T," where "T" is a type that is as specific as the contents of the strongly typed component permit.

Using this technique for generating a class interface allows the same class interface to be generated for all regular expressions that are substantially the same, even if those regular expressions are different in form. Regular expressions that are different in form may be reduced to the same graphs, from which the same class interfaces may be derived. Thus, the above techniques provide a high degree of consistency. The above techniques can be used to convert any regular expression, of any degree of complexity, into a class interface that comprises methods with return types that are as specific as the graph corresponding to the regular expression permits.

DETAILED DESCRIPTION OF EMBODIMENT(S)

Overview

According to techniques described herein, graphs are derived automatically from regular expressions. In fact, the same graph sometimes can be derived from multiple regular expressions that are different in form. Such a graph preserves type-specific information represented by a regular expression while avoiding much of the complexity that inheres in that regular expression's form. Once a graph has been derived from a regular expression, a class interface with appropriate type-specific methods can be derived automatically from the graph.

Example Graph

Figure 1:
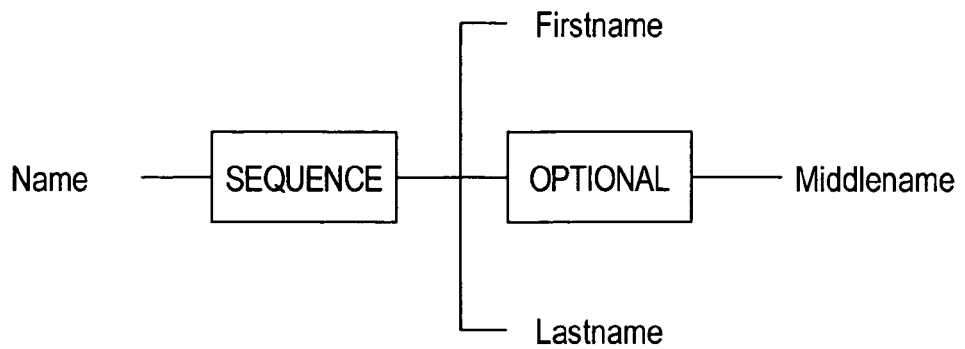
FIG. 1 is a diagram that illustrates a tree structure that represents a regular expression.
Figure 2:
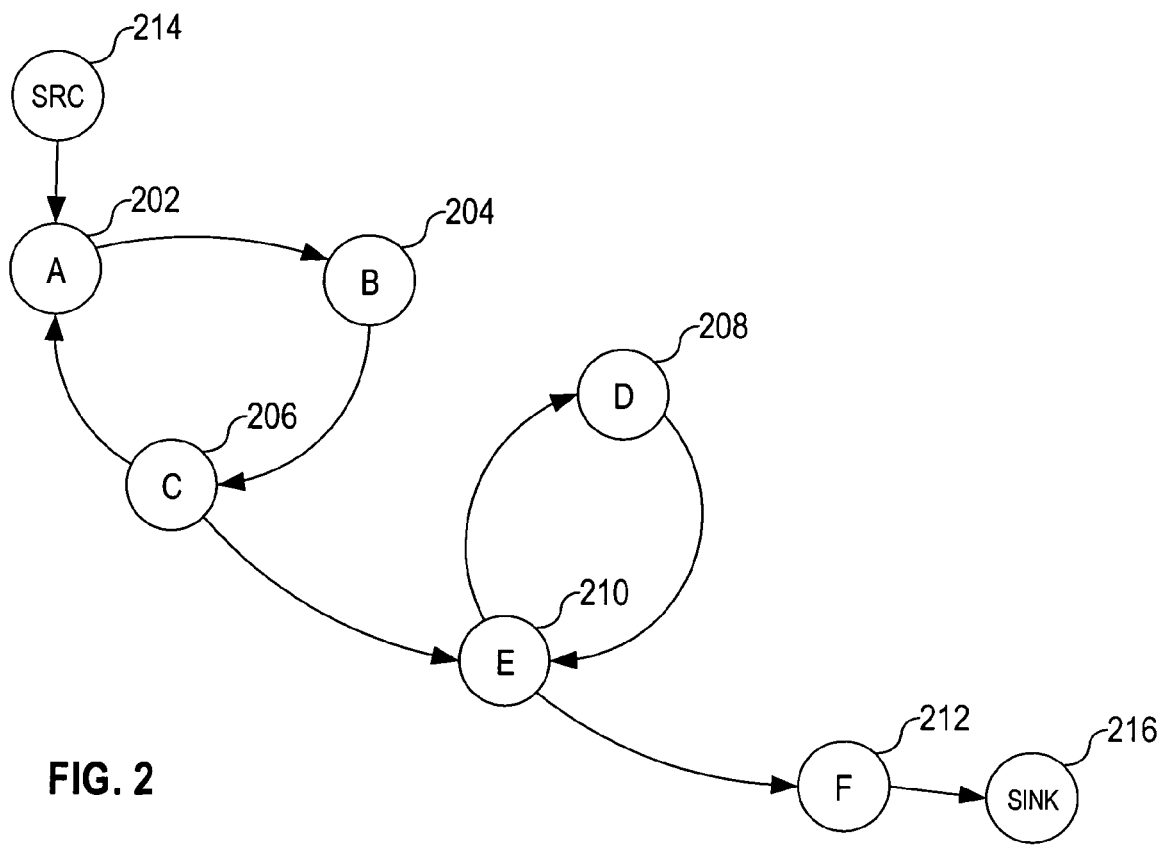
FIG. 2 is a diagram that illustrates an example of a graph automatically generated based on a regular expression, according to an embodiment of the invention.

FIG. 2 is a diagram that illustrates an example of a graph automatically generated based on a regular expression, according to an embodiment of the invention. Although techniques described herein refer to generating graphs, embodiments of the invention do not require that such graphs actually be generated in a visible form. Such graphs may be generated and represented by data structures within the memory of a computer system, for example, without ever being displayed to a human being. The graph is an intermediate representation of certain aspects of a regular expression. Class and methods are generated based on the intermediate representation. It is not necessary for the intermediate representation to be displayed.

The graph illustrated in FIG. 2 comprises nodes 202-216. Node 202 corresponds to "A," node 204 corresponds to "B," node 206 corresponds to "C," node 208 corresponds to "D," node 210 corresponds to "E," and node 212 corresponds to "F." Node 214 is a "source" node, and node 216 is a "sink" node. The graph corresponds to at least the following regular expression:

((A, B, C)*, E, (D,E)*, F)

Sequences that conform to this regular expression comprise zero or more (denoted by the asterisk in the regular expression) sequences of "ABC," followed by exactly one "E," followed by zero or more sequences of "DE," followed by exactly one "F." Other different regular expressions also may correspond to the graph of FIG. 2.

The directed edges in the graph of FIG. 2 indicate the order in which the symbols of the nodes of FIG. 2 occur within sequences that conform to the corresponding regular expression. For example, the directed edge leading from node 202 to node 204 indicates that "B" occurs after "A" in a conforming sequence. Similarly, the directed edges leading from node 206 to nodes 202 and node 210 indicate that "C" may be followed by either "A" or "E" in a conforming sequence. According to one embodiment of the invention, the graph is generated in such a way that any alphabet occurs at most once, so that there are never two nodes that have the same label.

According to one embodiment of the invention, a graph of the kind shown in FIG. 2 is automatically generated based on a regular expression to which that graph corresponds. For example, a computer program may automatically generate such a graph by parsing and analyzing the corresponding regular expression.

Some information in the regular expression might not be, and does not need to be, preserved in the graph that is derived from the regular expression. Thus, the fact that a particular symbol in the regular expression might occur zero times in a conforming sequence does not need to be preserved in the graph corresponding to the regular expression. The fact that such a symbol could occur more than zero times in a conforming sequence is enough to merit the inclusion, in the graph, of a node that corresponds to that symbol. It is not necessarily possible, or necessary, to reconstruct the exact regular expression from which a graph is derived based only on the information represented in the graph.

Strongly Connected Component Decomposition

According to one embodiment of the invention, after a graph has been generated automatically based on a regular expression, the graph is "decomposed" automatically into separate "strongly connected components." A strongly connected component is defined as either (a) a set of one or more nodes in which a cycle exists or (b) a single node that is not part of any cycle. "Decomposing" a graph into strongly connected components means identifying all of the strongly connected components that exist in the graph. A computer program may perform the decomposition automatically, for example.

Figure 3:
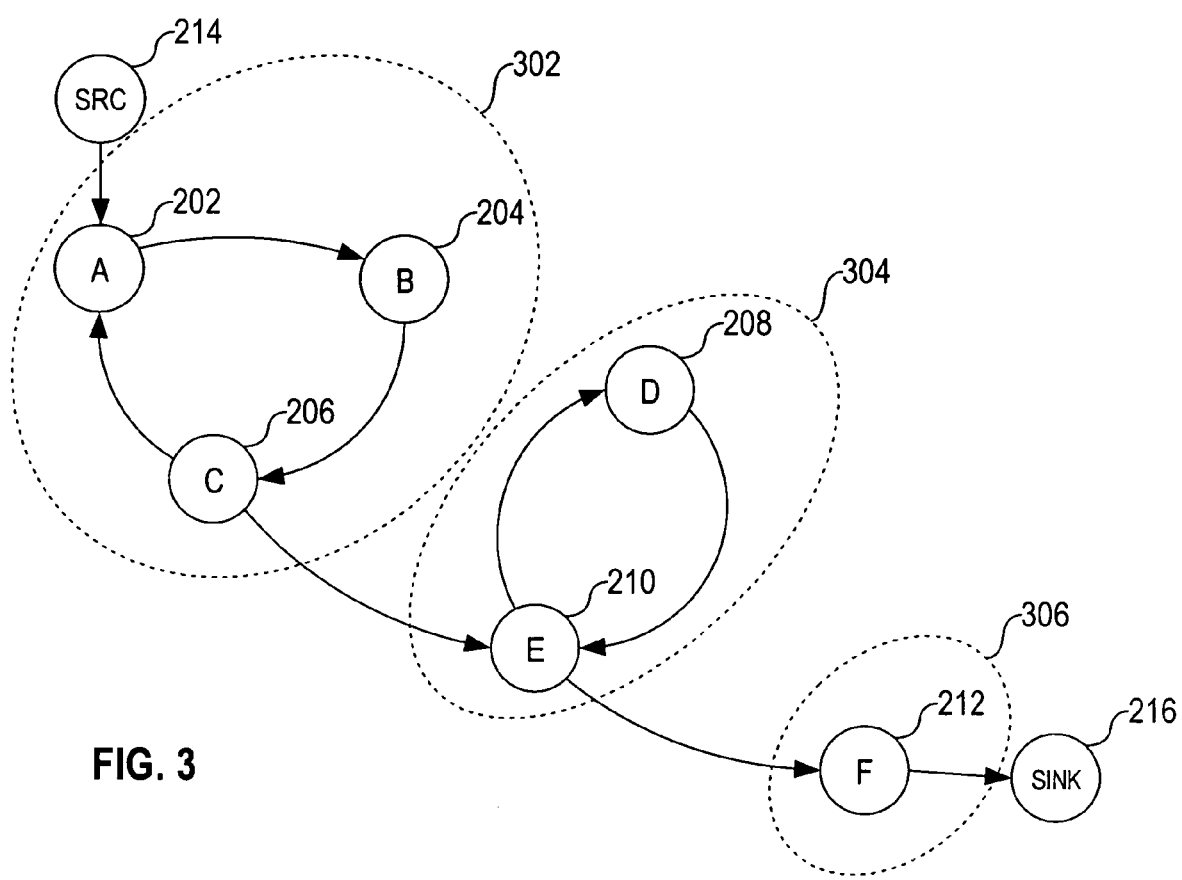
FIG. 3 is a diagram that illustrates an example of a graph in which strongly connected components have been identified, according to an embodiment of the invention.

FIG. 3 is a diagram that illustrates an example of a graph in which strongly connected components have been identified, according to an embodiment of the invention. Because nodes 202, 204, and 206 are in a cycle, these nodes are considered to be a part of strongly connected component 302. Because nodes 208 and 210 are in a cycle, these nodes are considered to be a part of strongly connected component 304. Node 212 is not a part of any cycle, so node 212 is itself considered to be a strongly connected component 306. "Source" node 214 and "sink" node 216 are special nodes which are not considered to be part of any strongly connected component.

The graph expresses an order between the strongly connected components. As can be seen in the graph of FIG. 3, strongly connected component 304 follows strongly connected component 302, and strongly connected component 306 follows strongly connected component 304. Although there may exist different paths through the graph, each sequence that conforms to the regular expression to which the graph corresponds will comprise a symbol from at least one node in each strongly connected component. Symbols from different strongly connected components will occur in an order relative to each other that is consistent with the graph's representation of the ordering of the strongly connected components.

Some strongly connected components may form a "cut set" of a graph. In graph theory terminology, a set of nodes forms a "cut set" if a graph becomes disjoint after removing the nodes in the set from the graph. In the graph of FIG. 3, all strongly connected components 302-306 are cut sets, but in some other graphs, some strongly connected components might not be cut sets. According to one embodiment of the invention, if a strongly connected component is a cut set, then the property generated from that strongly connected component is "mandatory," in that every instance which conforms to the graph's corresponding regular expression must include least one element that matches at least one member of that strongly connected component. In Java, this translates to a method that must receive and return a value other than "null" (which represents a "missing value"). For example, if the type corresponding to a strongly connected component is "int," then whether the type is mandatory or not can make a difference between the component's method's return type will be the primitive "int" (which implies that the method can't receive or return "null") or "java.lang.Integer" (which implies that the method can receive and return "null").

Graph-Based Class Interface Generation

According to one embodiment of the invention, each strongly connected component in the graph corresponds to a separate method that is to be generated automatically in a class interface for the regular expression from which the graph was derived. According to one embodiment of the invention, for each such strongly connected component in the graph, a corresponding method, with an appropriate return type, is automatically generated. For example, a computer program may automatically generate the methods based on the graph.

In one embodiment of the invention, if a strongly connected component comprises a cycle, then the return type of the corresponding method is set to be of type "List." Alternatively, if a strongly connected component does not comprise any cycle, then the return type of the corresponding method is set to be of a specific type that corresponds to the type of the node in that strongly connected component.

For example, in the graph of FIG. 3, there are three strongly connected components 302-306. Strongly connected component 302 comprises a cycle of three nodes, so, within a class interface, a method "getABC" may be generated with return type "List." Strongly connected component 304 comprises a cycle of two nodes, so within the class interface, a method "getDE" may be generated with return type "List." Strongly connected component 306 comprises only one node that is not involved in any cycle, so within the class interface, a method "getF" may be generated with a more specific return type "F." Return type "F" corresponds to the type of node 212 in strongly connected component 306. It is certain that this method will only read XML elements that are of type "F," so the return type of this method can be more specific.

Based on the graph shown in FIG. 3, the following example class interface might be automatically generated:

```
Class X {
    List getABC( );
    List getDE( );
    F getF( );
}
```

Using the above techniques for generating a class interface allows the same class interface to be generated for all regular expressions that are substantially the same, even if those regular expressions are different in form. Regular expressions that are different in form may be reduced to the same graphs, from which the same class interfaces may be derived. Thus, the above techniques provide a high degree of consistency. The above techniques can be used to convert any regular expression, of any degree of complexity, into a class interface that comprises methods with return types that are as specific as the graph corresponding to the regular expression permits.

Example Flow

Figure 4:
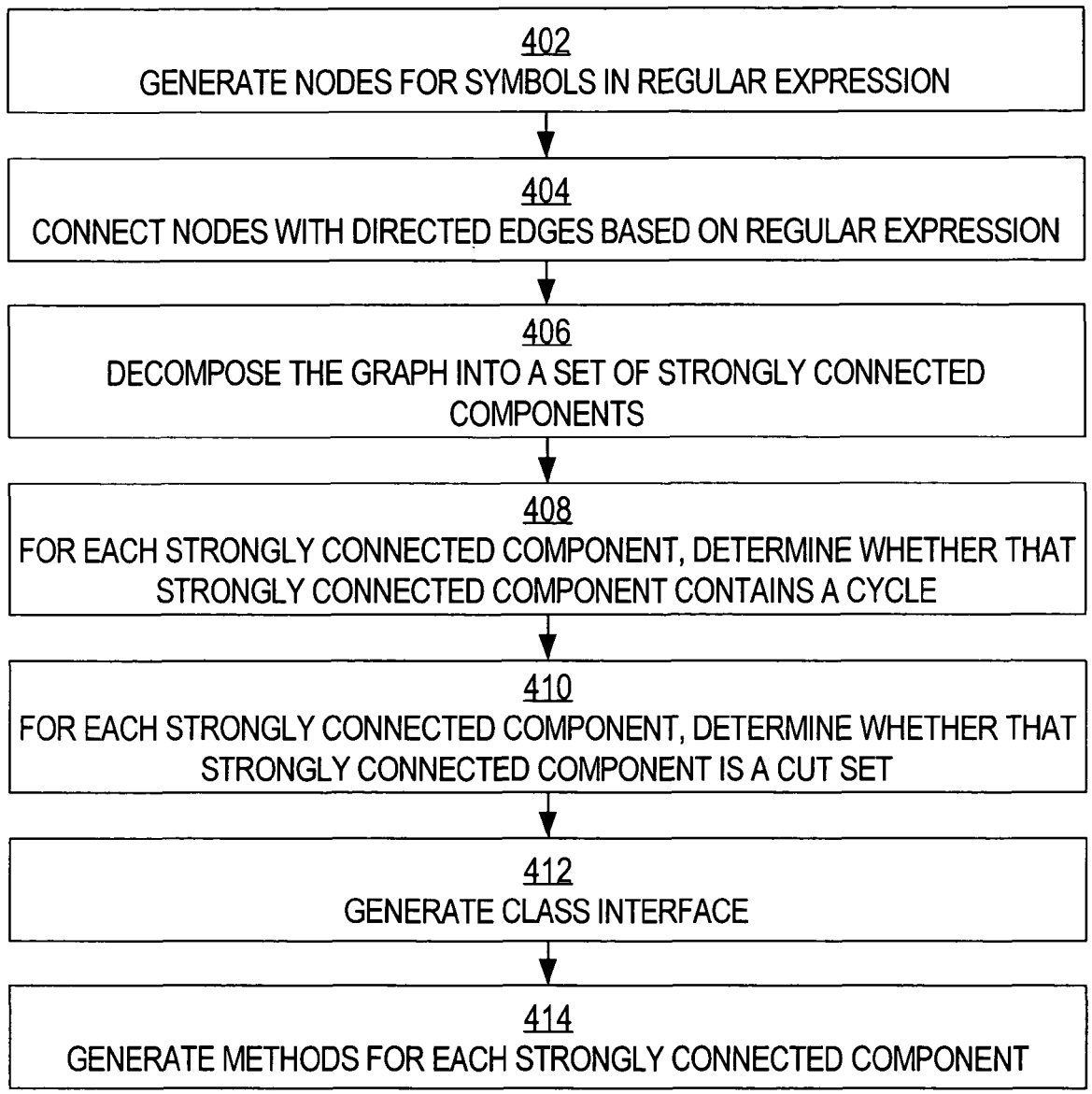
FIG. 4 is a flow diagram that illustrates an example of a graph-based technique for automatically generating a class interface that corresponds to a regular expression, according to an embodiment of the invention.

FIG. 4 is a flow diagram that illustrates an example of a graph-based technique for automatically generating a class interface that corresponds to a regular expression, according to an embodiment of the invention. Such a technique may be performed automatically by a computer program, for example.

In block 402, for each unique symbol that occurs within the regular expression, a separate node is generated for that symbol. For example, the regular expression might be:

((A, B, C)*, E, (D, E)*, F)

In this case, although the symbol "E" appears twice in the regular expression, only one node is generated for that symbol. Based on this regular expression, six nodes would be generated, such as is shown in FIG. 2. Thus, a set of nodes is generated. In order to generate a graph, the nodes need to be connected.

In block 404, for each node in the set of nodes, that node is connected to one or more other nodes in the set of nodes. The nodes are connected with directed edges that indicate an order between the connected nodes. The connections between the nodes are based on the order in which symbols corresponding to the nodes occur within the regular expression relative to other symbols in the regular expression. Thus, a graph is automatically generated based on the regular expression.

For example, in the graph shown in FIG. 2, node 202 is connected to node 204 by a directed edge that leads from node 202 to node 204. This directed edge is placed in the graph because, in the corresponding regular expression, the symbol "A," which corresponds to node 202, can occur before symbol "B," which corresponds to node 204.

For another example, in the graph shown in FIG. 2, node 206 is connected to node 202 by a directed edge that leads from node 206 to node 202. This directed edge is placed in the graph because, in the corresponding regular expression, the symbol "C," which corresponds to node 206, can occur before symbol "A," which corresponds to node 202. The reason why symbol "C" can occur before symbol "A" is because the regular expression indicates (via an asterisk) that the sequence "ABC" can occur more than once in a sequence that conforms to the regular expression. Consequently, if the sequence "ABC" repeats, then symbol "C" may occur before symbol "A."

In block 406, the graph is decomposed into a set of strongly connected components. Algorithms that decompose a graph into a set of strongly connected components are well known and are not described in great detail herein.

In block 408, for each strongly connected component in the graph, a determination is made as to whether that strongly connected component contains a cycle.

In block 410, for each strongly connected component in the graph, a determination is made as to whether that strongly connected component is a cut set, as described above.

In block 412, a class interface is automatically generated for the regular expression. For example, if the regular expression represents the structure to which a "Name" entity must adhere, then the initial class interface, unpopulated by methods yet, might take the form:

Class Name {
}

In block 414, for each strongly connected component in the graph, a method for that strongly connected component is generated based on whether that strongly connected component comprises a cycle, and based on whether that strongly connected component is a cut set. Each such method is placed within the class interface generated in block 412.

In one embodiment of the invention, if a strongly connected component comprises a cycle, then the method generated for that strongly connected component is given a "List" return type. Alternatively, if the strongly connected component does not comprise a cycle, then the method generated for that strongly connected component is given a return type that is specific to and depends on a type that is associated with a node within the strongly connected component.

For example, in response to a determination that strongly connected component 302 of FIG. 3 comprises a cycle, a method with a return type "List" may be generated automatically and placed within the class interface. For example, the method, including return type, might take the form:

List <T> getABC( );

In the above method, <T> represents the most specific "ancestor" type (in the type hierarchy) of all of the types of the elements that can be placed in the list. Sometimes <T> is <Object>, when the types of the elements (in this case, A, B, and C) that can be placed in the list have no more specific common ancestor type. Other times, <T> is a type that is more specific than <Object>.

Similarly, in response to a determination that strongly connected component 304 of FIG. 3 comprises a cycle, a method with a return type "List" may be generated automatically and placed within the class interface. For example, the method, including return type, might take the form:

List <T> getDE( );

If the type of "D" and the type of "E" were both descendant types of type <Foo>, and if <Foo> was the most specific type that was an ancestor of the types of both "D" and "E," then <T> would be <Foo> in this case.

In contrast, in response to a determination that strongly connected component 306 of FIG. 3 doesn't comprise a cycle, a method with a return type "F" (i.e., the type that is associated with node 212) may be generated automatically and placed within the class interface. For example, the method, including return type, might take the form:

F getF( );

After the class interface and the methods within have been automatically generated, a schema compiler can automatically generate code that implements the functionality of each method. For example, a schema compiler might automatically implement the method "getABC" to get one or more symbols that comprise "A," "B," and "C," and return those symbols in a list structure. For another example, a schema compiler might automatically implement the method "getF" to get exactly one "F" symbol and return that symbol as an "F" type. More practically speaking, the methods can be implemented to read XML elements from an XML document that conforms to the regular expression based on which the graph was generated.

Hardware Overview

Figure 5:
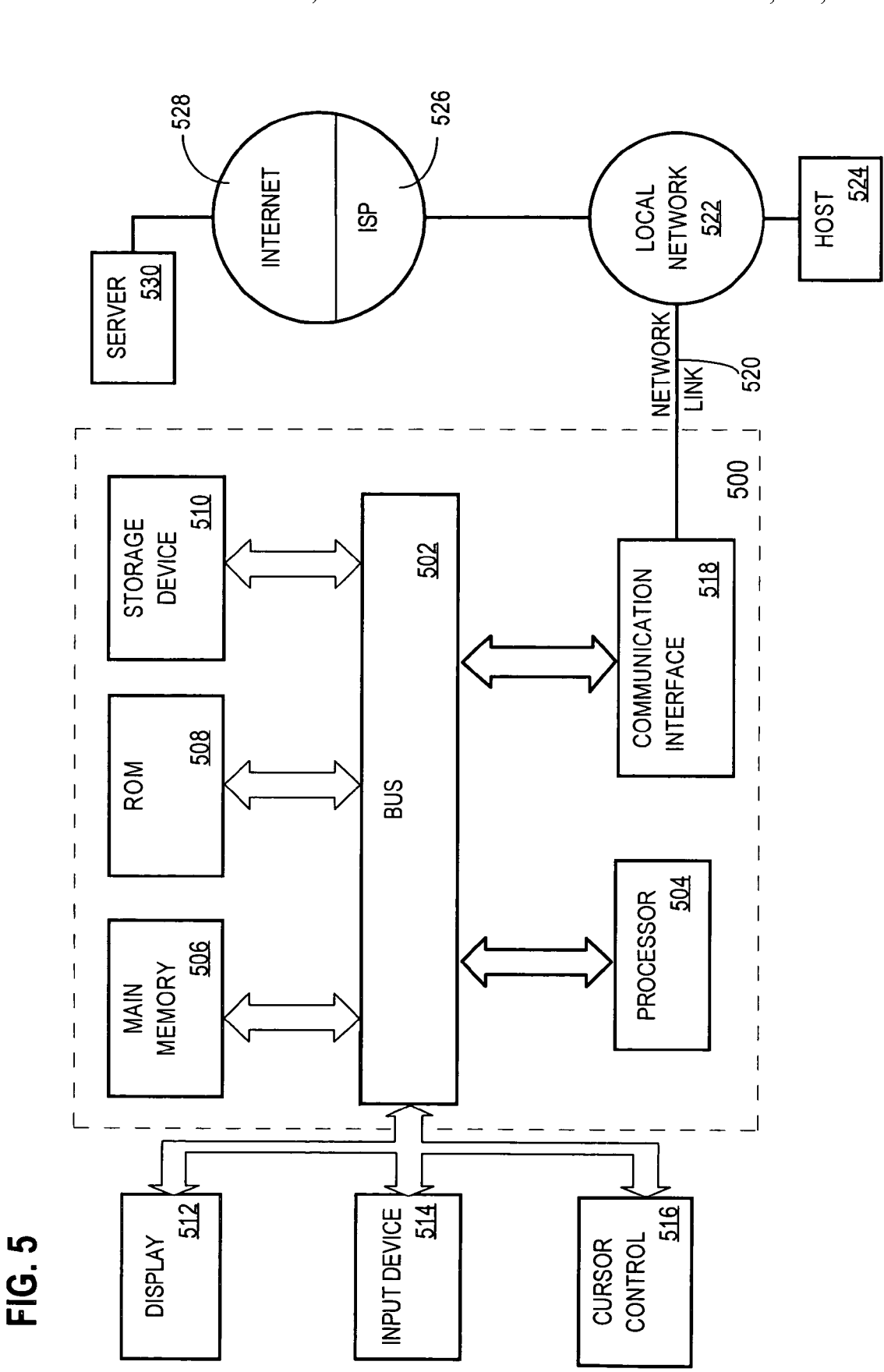
FIG. 5 is a hardware block diagram of an example computer entity, upon which certain embodiments of the invention may be implemented.

FIG. 5 is a block diagram that illustrates a computer system 500 upon which an embodiment of the invention may be implemented. Computer system 500 includes a bus 502 for facilitating information exchange, and one or more processors 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions by processor 504. Computer system 500 may further include a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

In computer system 500, bus 502 may be any mechanism and/or medium that enables information, signals, data, etc., to be exchanged between the various components. For example, bus 502 may be a set of conductors that carries electrical signals. Bus 502 may also be a wireless medium (e.g. air) that carries wireless signals between one or more of the components. Bus 502 may also be a medium (e.g. air) that enables signals to be capacitively exchanged between one or more of the components. Bus 502 may further be a network connection that connects one or more of the components. Overall, any mechanism and/or medium that enables information, signals, data, etc., to be exchanged between the various components may be used as bus 502.

Bus 502 may also be a combination of these mechanisms/media. For example, processor 504 may communicate with storage device 510 wirelessly. In such a case, the bus 502, from the standpoint of processor 504 and storage device 510, would be a wireless medium, such as air. Further, processor 504 may communicate with ROM 508 capacitively. In this instance, the bus 502 would be the medium (such as air) that enables this capacitive communication to take place. Further, processor 504 may communicate with main memory 506 via a network connection. In this case, the bus 502 would be the network connection. Further, processor 504 may communicate with display 512 via a set of conductors. In this instance, the bus 502 would be the set of conductors. Thus, depending upon how the various components communicate with each other, bus 502 may take on different forms. Bus 502, as shown in FIG. 5, functionally represents all of the mechanisms and/or media that enable information, signals, data, etc., to be exchanged between the various components.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any non-transitory medium that participates in providing data that causes a machine to operate in a specific fashion. In an embodiment implemented using computer system 500, various machine-readable media are involved, for example, in providing instructions to processor 504 for execution. Such a medium may take many forms, including but not limited to, non-volatile media and volatile media. Non-volatile media includes, for example, optical or magnetic disks, such as storage device 510. Volatile media includes dynamic memory, such as main memory 506.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

Processor 504 may execute the received code as the code is received and/or stored in storage device 510 or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A machine implemented method for automatically generating a class interface, comprising:
   generating a graph based on a regular expression;
   identifying strongly connected components within the graph; and
   for each strongly connected component within the graph, generating, within the class interface, a separate method that corresponds to that strongly connected component.

2. The method of claim 1, wherein the step of generating a method that corresponds to the strongly connected component comprises:
   generating a method that has a return type that is based on whether the strongly connected component comprises a cycle.

3. The method of claim 1, wherein the step of generating a method that corresponds to the strongly connected component comprises:
   determining whether the strongly connected component comprises a cycle; and
   in response to a determination that the strongly connected component comprises a cycle, generating a method that has a "List" return type.

4. The method of claim 1, wherein the step of generating a method that corresponds to the strongly connected component comprises:
   determining whether the strongly connected component comprises a cycle; and
   in response to a determination that the strongly connected component does not comprise a cycle, generating a method that has a return type that is specific to and depends on a type associated with a node within the strongly connected component.

5. The method of claim 1, wherein the step of generating a method that corresponds to the strongly connected component comprises:
   generating a method that has a return type that is based on whether the strongly connected component is a cut set.

6. The method of claim 1, wherein the step of generating the graph based on the regular expression comprises:
   generating a separate node for each unique symbol that occurs within the regular expression, thereby generating a set of nodes; and
   for each node in the set of nodes, connecting, with one or more directed edges, that node to one or more other nodes in the set of nodes based on an order in which a symbol that corresponds to that node can occur relative to other symbols in the regular expression.

7. A non-transitory machine-readable medium carrying one or more sequences of instructions, which instructions, when executed by one or more processors, cause the one or more processors to carry out the steps of:
   automatically generating a graph based on a regular expression;
   automatically identifying strongly connected components within the graph; and
   for each strongly connected component within the graph, automatically generating, within the class interface, a separate method that corresponds to that strongly connected component.

8. The non-transitory machine-readable medium of claim 7, wherein the step of generating a method that corresponds to the strongly connected component comprises:
   generating a method that has a return type that is based on whether the strongly connected component comprises a cycle.

9. The non-transitory machine-readable medium of claim 7, wherein the step of generating a method that corresponds to the strongly connected component comprises:
   determining whether the strongly connected component comprises a cycle; and
   in response to a determination that the strongly connected component does not comprise a cycle, generating a method that has a return type that is specific to and depends on a type associated with a node within the strongly connected component.

10. The non-transitory machine-readable medium of claim 7, wherein the step of generating a method that corresponds to the strongly connected component comprises:
    determining whether the strongly connected component comprises a cycle; and
    in response to a determination that the strongly connected component does not comprise a cycle, generating a method that has a return type that is specific to and depends on a type associated with a node within the strongly connected component.

11. The non-transitory machine-readable medium of claim 7, wherein the step of generating a method that corresponds to the strongly connected component comprises:
    generating a method that has a return type that is based on whether the strongly connected component is a cut set.

12. The non-transitory machine-readable medium of claim 7, wherein the step of generating the graph based on the regular expression comprises:
    generating a separate node for each unique symbol that occurs within the regular expression, thereby generating a set of nodes; and
    for each node in the set of nodes, connecting that node to one or more other nodes in the set of nodes with one or more directed edges based on an order in which a symbol that corresponds to that node can occur relative to other symbols in the regular expression.

13. An apparatus comprising:
    a mechanism for automatically generating a graph based on a regular expression;
    a mechanism for automatically identifying strongly connected components within the graph; and
    a mechanism for automatically generating, within the class interface, for each strongly connected component within the graph, a separate method that corresponds to that strongly connected component.

14. The apparatus of claim 13, wherein the mechanism for generating a method that corresponds to the strongly connected component comprises:

a mechanism for generating a method that has a return type that is based on whether the strongly connected component comprises a cycle.

15. The apparatus of claim 13, wherein the mechanism for generating a method that corresponds to the strongly connected component comprises:

a mechanism for determining whether the strongly connected component comprises a cycle; and a mechanism for generating a method that has a "List" return type in response to a determination that the strongly connected component comprises a cycle.

16. The apparatus of claim 13, wherein the mechanism for generating a method that corresponds to the strongly connected component comprises:

a mechanism for determining whether the strongly connected component comprises a cycle; and a mechanism for generating a method that has a return type that is specific to and depends on a type associated with a node within the strongly connected component in response to a determination that the strongly connected component does not comprise a cycle.

17. The apparatus of claim 13, wherein the mechanism for generating a method that corresponds to the strongly connected component comprises:

a mechanism for generating a method that has a return type that is based on whether the strongly connected component is a cut set.

18. The apparatus of claim 13, wherein the mechanism for generating the graph based on the regular expression comprises:

a mechanism for generating a separate node for each unique symbol that occurs within the regular expression, thereby generating a set of nodes; and a mechanism for connecting, with one or more directed edges, each node in the set of nodes to one or more other nodes in the set of nodes based on an order in which a symbol that corresponds to that node can occur relative to other symbols in the regular expression.

* * * * *